Patented Sept. 19, 1933

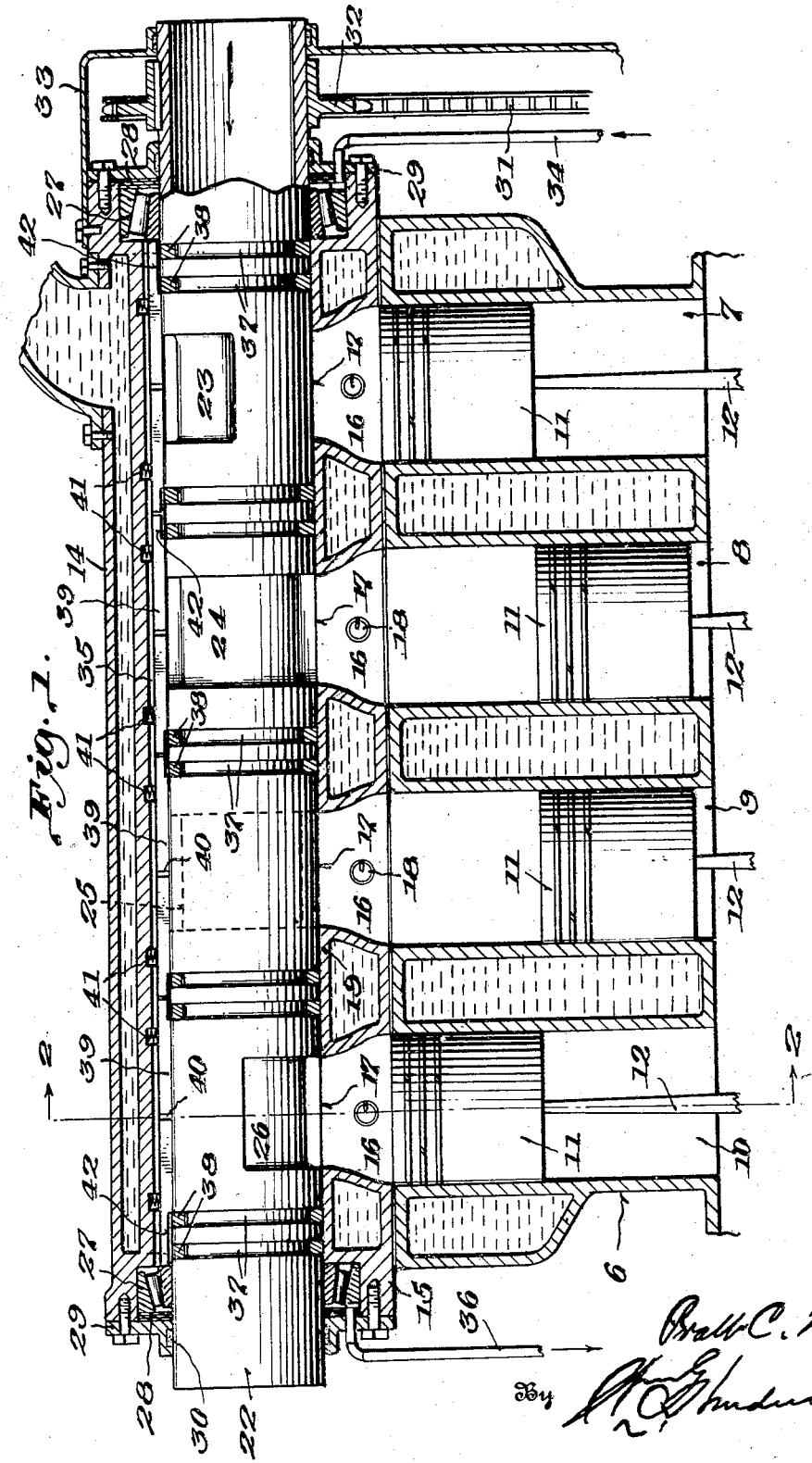

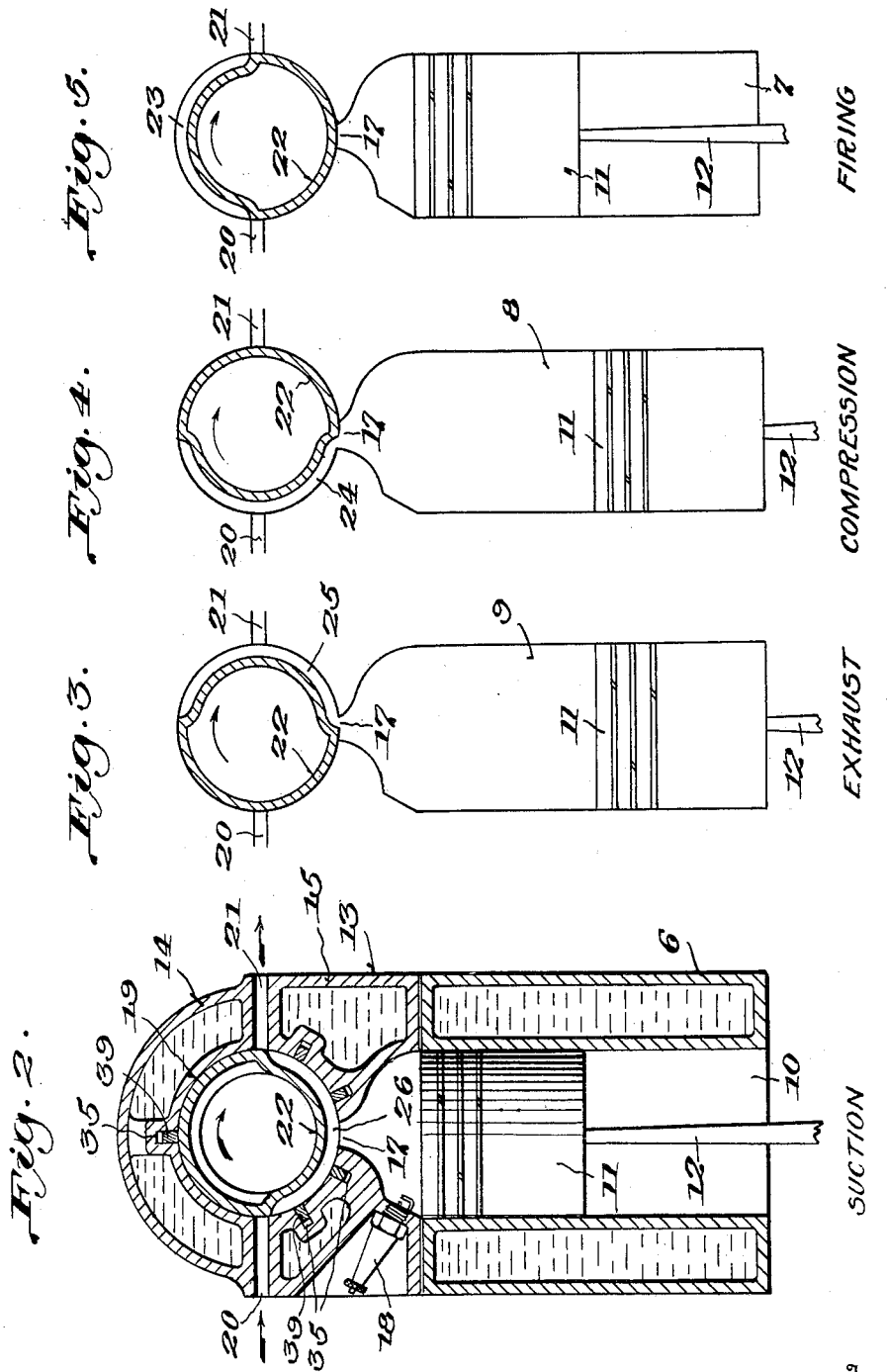

1,927,348

UNITED STATES PATENT OFFICE 1,927,348

ROTARY VALVE FOR INTERNAL COMBUSTION ENGINES

Pratt C. Morris, Madison, Ga., assignor, by direct and mesne assignments, of twenty-four one-hundredths to Robert J. Wilkinson, Augusta, Ga., and forty one-hundredths to W. L. Carmichel, Morgan County, Ga.

Application March 26, 1931. Serial No. 525,544

2 Claims. (Cl. 123—190)

This invention relates to improvements in internal combustion engines, and more especially to a novel engine having a single rotary valve to control the admission of the explosive mixture and the discharge of the exhaust gases from all of the cylinders.

Some of the objects of the invention are to provide a hollow rotary valve designed to permit the circulation of cooling air therethrough, and one which is light in weight, noiseless and balanced.

A further object is to furnish a rotary valve that will cooperate with the intake and exhaust ports of the cylinder heads, so that the intake port of each cylinder remains open throughout substantially the entire intake stroke, while the exhaust port remains open throughout substantially the entire exhaust stroke.

Another object is to provide a valve of this character, having a minimum number of parts, and one which cooperates with roller bearings so arranged as to take up end play.

A still further object is to furnish a valve of this type, which may be readily lubricated and which will cooperate with novel packing that will prevent the transference of gases from one cylinder to another.

A further object is to provide an engine, each cylinder of which has a single relatively small port for passing gases to and from the combustion chamber of the cylinder, so that there will be a minimum exposure of valve surfaces to the gases.

In poppet valve type engines, the exhaust valve opens 40° before the piston finishes its working stroke, while in accordance with my invention, the exhaust valve does not open until about 7° before the end of the working stroke. In other words, the valve in accordance with my invention, opens and closes when the crank shaft is at dead center, and there is no travel of the piston. Consequently, the gas is completely burned, before the exhaust valve opens.

With the foregoing objects outlined and with other objects in view which will appear as the description proceeds, the invention consists in the novel features hereinafter described in detail, illustrated in the accompanying drawings, and more particularly pointed out in the appended claims.

In the drawings,

Fig. 1 is a vertical longitudinal sectional view of an internal combustion engine in which my improvements are incorporated.

Fig. 2 is a transverse vertical sectional view on the line 2—2, of Fig. 1, and showing the position of the valve when the piston in No. 4 cylinder is about to commence its suction stroke.

Fig. 3 is a diagrammatic view showing the position of the parts with relation to No. 3 cylinder at this same instant, with the piston in No. 3 cylinder commencing its exhaust stroke.

Fig. 4 is a similar view but showing the relation of the valve in connection with No. 2 cylinder, while the piston in that cylinder is beginning the compression stroke.

Fig. 5 is a like view showing the relation of the parts in cylinder No. 1, when the piston in that cylinder is in firing position, with the valve closed.

Referring to the drawings, 6 designates a cylinder block having a first cylinder 7, a second cylinder 8, a third cylinder 9, and a fourth cylinder 10.

As is customary, each cylinder cooperates with a piston 11, the connecting rods 12 of which extend to the conventional crank shaft, not shown.

The engine preferably has a removable head 13 which may be made up of an upper section 14 and a lower section 15, the latter forming substantially conical combustion chambers 16 which terminate in relatively narrow ports 17, through which the gases pass to and from the cylinders.

While the engine may be cooled in any preferred way, it is shown as of hollow wall construction to permit the circulation of water.

Each combustion chamber is equipped with a spark plug 18 for igniting the explosive mixture admitted to the same.

The sectional head of the engine forms a cylindrical bore 19 extending lengthwise of the engine, and the head has, at each side of said bore, a series of four intake ports 20, and a series of exhaust ports 21, it being understood that there is one intake port and one exhaust port for each cylinder. These ports, as well as the ports 17, cooperate with a valve sleeve 22 that rotates within the bore 19 and is provided with four circumferentially extending peripherally positioned recesses 23, 24, 25 and 26. These recesses are either cut in the wall of the valve sleeve, or if the latter be cast, then the recesses can be formed in the casting operation. It will be noted that each recess extends for substantially 180° about the circumference of the valve sleeve, and that recesses 26 and 23 and at opposite sides of the sleeve, while the recesses 24 and 25 are located between recesses 26 and 23, and on opposite sides of the sleeve, so that gaseous fuel will be delivered to the series of piston cylinders in sequence in rotation of the sleeve, and likewise exhausted in sequence from the whole series of cylinders. That arrangement gives an efficient balanced construction of valve.

Owing to the hollow construction of the valve, cooling air from the fan, (not shown), of the engine, is forced through the sleeve, as indicated by the arrow in Fig. 1, and if desired, the air thus heated may be taken from the sleeve for heating the interior of the motor vehicle which the engine drives.

The end portions of the valve sleeve are preferably mounted in anti-friction thrust bearings 27, wear, in which, may be taken up by the use of shims 28 that are held in place by removable end plates 29 which carry sealing rings 30. These rings bear upon the periphery of the sleeve and prevent loss of oil at these places.

The valve sleeve is rotated by any suitable means such as a sprocket chain 31 which may lead from the crank shaft to a sprocket wheel 32 that is fast on one end of the sleeve. A suitable housing 33 may be employed to close in this drive mechanism.

For lubrication purposes, oil is forced into the bore 19 through a feed pipe 34. This oil, after lubricating the front bearing 27, can flow along grooves 35 which extend lengthwise of the bore 19, and then, after lubricating the sleeve and the rear bearing 27, it will be discharged through a tube 36. To prevent passage of gases from one cylinder to another, the sleeve 22 has external pairs of circumferential grooves 37, positioned between the recesses which form the gas passageways, and each groove 37 contains a packing ring 38 which may be of the type commonly employed with pistons. These rings cooperate with packing strips 39 which are arranged in the longitudinal grooves 35 and are notched as shown at 40, to allow oil from the grooves 35 to flow into contact with the periphery of the valve sleeve. The strips 39 are yieldingly held against the periphery of the sleeve by any suitable means such as springs 41 which are arranged in the grooves and bear against the strips.

By forming the grooves 35 in the head block 13, 14 of the cylinders, the packing strips 39 and the springs 41 are cooled by the water circulating through the engine jacket which prevents injurious effects on these parts by the heat of combustion. The faces of packing strips 39 are cut away or recessed slightly at 42 to prevent them forcing the rings 38 from contact with the face of the bore 19 as the packing strips become worn and thus preventing leakage past the packing rings.

In operation, it will be noted in Fig. 2 that the piston of the fourth cylinder is about to commence its suction stroke, and that the recess 26 of the valve sleeve, (turning in the direction of the arrow, or clock-wise), is about to open communication between intake port 20 and port 17, just as the sleeve cuts off communication between port 17 and exhaust port 21. As the piston moves downwardly, while the crank shaft is travelling substantially 180°, the sleeve 22 will be turning about 90°, and consequently, the explosive mixture will be drawn into the fourth cylinder, until the piston of that cylinder comes to a halt at the bottm of its stroke, due to the crank shaft reaching dead center. At such time, the piston in No. 4 cylinder will have reached the position illustrated in Fig. 4, and the valve 22 will be ready to close the port 17 as the piston starts up its compression stroke. As the piston rises and the valve 22 turns, the port 17 will be closed until the piston reaches the firing position, as indicated in Fig. 5, and in travelling to this position, the crank shaft will have turned another approximately 180°, while the valve sleeve will have turned approxmately 90°. When the charge is now ignited by the spark plug 18, the port 17 will be kept closed until the piston reaches the lower end of its stroke, and the cylinder is about to exhaust. At this time, the parts will be in the positions shown in Fig. 3, and it is obvious that the recess 25 at this time will keep the port 17 in communication with the exhaust port 21, until the piston has completed its exhaust stroke.

From the foregoing it is believed that the construction, operation and advantages of the invention may be readily understood by those skilled in the art, and I am aware that changes may be made in the details disclosed, without departing from the spirit of the invention, as expressed in the claims.

It will be understood that with the recesses 23, 24, 25 and 26 of the sleeve valve positioned along and around the periphery of the sleeve valve in relation to the several piston cylinders as illustrated, the gaseous fuel will be admitted to and exhausted from each of the cylinders in sequence in the order of steps described for the illustration contained in Figure 2 of the drawings, such order of steps recurring in successive cycles of rotation of the sleeve valve, for which is claimed, lessening friction and obtaining smoother and more uniform running of the parts, and less waste of power energy in operation.

What I claim and desire to secure by Letters Patent is:

1. An internal combustion engine comprising a plurality of cylinders, reciprocating pistons in the cylinders, a bore, a port placing each cylinder in communication with said bore, an intake port and an exhaust port for each cylinder communicating with the bore, a rotary valve arranged in the bore and having circumferentially disposed recesses in its periphery for placing the cylinder ports in communication with said intake and exhaust ports, each of said recesses being of sufficient length to place the port of its complementary cylinder in communication with the intake port of that cylinder during substantially the entire suction stroke of the piston of that cylinder, and to place the port of that cylinder in communication with the exhaust port of the bore during substantially the entire exhaust stroke of the last mentioned piston, annular packing rings positioned on the valve sleeve between the cylinder ports to prevent passage of gases between the several cylinders, a groove extending longitudinally of the bore to supply a lubricant to the sleeve valve, and a packing strip fitting in said groove and having portions over the annular packing rings cut away to prevent said packing strip from contacting with the annular packing rings.

2. An internal combustion engine comprising a plurality of cylinders, reciprocating pistons in the cylinders, a bore, a port placing each cylinder in communication with said bore, an intake port and an exhaust port for each cylinder communicating with the bore, a rotary valve arranged in the bore and having recesses in its periphery for placing the first mentioned ports in communication with said intake and exhaust ports, each of said recesses being of sufficient length to place the port of its complementary cylinder in communication with the intake port of the piston of that cylinder, and to place the port of that cylinder in communication with the exhaust port thereof during substantially the entire exhaust stroke of the last mentioned piston, oil conducting grooves arranged lengthwise of the bore, packing strips in said oil conducting grooves having notches for feeding oil from the last mentioned grooves into contact with the periphery of the sleeve, and yielding means for forcing said strips into contact with the sleeve.

PRATT C. MORRIS.